(12) United States Patent
Grant et al.

(10) Patent No.: US 9,814,974 B2
(45) Date of Patent: Nov. 14, 2017

(54) PERIPHERAL DEVICE WITH HAPTIC DIMINISHMENT PREVENTION COMPONENT

(71) Applicant: Immersion Corporation, San Jose, CA (US)

(72) Inventors: Danny Grant, Laval (CA); Aaron Kapelus, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 14/877,137

(22) Filed: Oct. 7, 2015

(65) Prior Publication Data

US 2016/0129347 A1    May 12, 2016

Related U.S. Application Data

(63) Continuation of application No. 14/538,976, filed on Nov. 12, 2014, now Pat. No. 9,174,134.

(51) Int. Cl.
*G06F 3/042* (2006.01)
*G06F 3/01* (2006.01)
(Continued)

(52) U.S. Cl.
CPC .......... *A63F 13/285* (2014.09); *A63F 13/211* (2014.09); *A63F 13/24* (2014.09);
(Continued)

(58) Field of Classification Search
CPC .......... A63F 13/02; A63F 13/08; A63F 13/20; A63F 2300/1037; A63F 2300/1043;
(Continued)

(56) References Cited

U.S. PATENT DOCUMENTS 5,473,126 A    12/1995  Wu
5,959,613 A    9/1999   Rosenberg et al.
(Continued)

FOREIGN PATENT DOCUMENTS

CN    1983125 A     6/2007
CN    103365415 A   10/2013
(Continued)

OTHER PUBLICATIONS

Conan Hughes, "Turn Off Wii Remote's Rumble Feature", Apr. 9, 2011, XP055172295, http://www.conanhughes.com/2011/04/turn-off-wii-remotes-rumble-feature.html.
(Continued)

*Primary Examiner* — Lawrence Galka
(74) *Attorney, Agent, or Firm* — Miles & Stockbridge P.C.

(57) ABSTRACT

A system is provided that modifies a haptic effect experienced at a user input element, where the user input element is positioned within the housing so that a first contact with the housing defines a first maximum range of a first movement of the user input element. The system receives a position of a user input element of a peripheral device. The system further sends a haptic effect definition to the haptic output device in response to the received position of the user input element. The system further causes the haptic output device to output a force to the user input element of the peripheral device in response to the haptic effect definition. The system further causes the haptic diminishment prevention to define a first diminishment range of the first movement of the user input element, where the first diminishment range is less than the first maximum range and prevents the first contact with the housing.

22 Claims, 9 Drawing Sheets

(51) Int. Cl.

| | |
|---|---|
| *A63F 13/285* | (2014.01) |
| *A63F 13/25* | (2014.01) |
| *A63F 13/98* | (2014.01) |
| *A63F 13/211* | (2014.01) |
| *G06F 3/16* | (2006.01) |
| *G09G 5/00* | (2006.01) |
| *A63F 13/24* | (2014.01) |

(52) U.S. Cl.
CPC ............... *A63F 13/25* (2014.09); *A63F 13/98* (2014.09); *G06F 3/016* (2013.01); *G06F 3/16* (2013.01); *G09G 5/00* (2013.01)

(58) Field of Classification Search
CPC ........ G06F 3/016; G06F 3/033; G06F 3/0338; G06F 3/0202; G05G 9/047; G05G 2009/04725
See application file for complete search history.

(56) References Cited

U.S. PATENT DOCUMENTS

| | | | |
|---|---|---|---|
| 6,005,551 | A | 12/1999 | Osborne et al. |
| 6,169,540 | B1 | 1/2001 | Rosenberg et al. |
| 6,343,349 | B1 | 1/2002 | Braun et al. |
| 6,424,356 | B2 | 7/2002 | Chang et al. |
| 6,468,158 | B1 | 10/2002 | Ootori et al. |
| 6,563,487 | B2 | 5/2003 | Martin et al. |
| 6,710,764 | B1 | 3/2004 | Burgel et al. |
| 7,336,260 | B2 | 2/2008 | Martin et al. |
| 7,791,588 | B2 | 9/2010 | Tierling et al. |
| 7,808,488 | B2 | 10/2010 | Martin et al. |
| 7,965,276 | B1 | 6/2011 | Martin et al. |
| 7,979,146 | B2 | 7/2011 | Ullrich et al. |
| 7,979,797 | B2 | 7/2011 | Schena |
| 8,000,825 | B2 | 8/2011 | Ullrich et al. |
| 8,159,461 | B2 | 4/2012 | Martin et al. |
| 8,164,573 | B2 | 4/2012 | Da Costa et al. |
| 8,210,942 | B2 | 7/2012 | Shimabukuro et al. |
| 8,378,964 | B2 | 2/2013 | Ullrich et al. |
| 8,384,316 | B2 | 2/2013 | Houston et al. |
| 8,723,820 | B1 | 5/2014 | Han |
| 8,754,757 | B1 | 6/2014 | Ullrich et al. |
| 8,754,758 | B1 | 6/2014 | Ullrich et al. |
| 2002/0024503 | A1 | 2/2002 | Armstrong |
| 2002/0080112 | A1 | 6/2002 | Braun et al. |
| 2004/0056840 | A1 | 3/2004 | Goldenberg et al. |
| 2005/0151720 | A1 | 7/2005 | Cruz-Hernandez et al. |
| 2006/0109256 | A1 | 5/2006 | Grant et al. |
| 2007/0013677 | A1* | 1/2007 | Rosenberg ............... A63F 13/06 345/173 |
| 2008/0223627 | A1 | 9/2008 | Lacroix et al. |
| 2008/0294984 | A1 | 11/2008 | Ramsay et al. |
| 2008/0297328 | A1 | 12/2008 | Crawford et al. |
| 2009/0033624 | A1 | 2/2009 | Rosenberg et al. |
| 2009/0088659 | A1 | 4/2009 | Graham et al. |
| 2009/0122006 | A1 | 5/2009 | Nielsen et al. |
| 2010/0122006 | A1 | 5/2010 | Kanaya |
| 2010/0148943 | A1 | 6/2010 | Rosenberg et al. |
| 2010/0173686 | A1 | 7/2010 | Grant et al. |
| 2010/0231541 | A1 | 9/2010 | Cruz-Hernandez et al. |
| 2011/0202155 | A1 | 8/2011 | Ullrich et al. |
| 2011/0215913 | A1 | 9/2011 | Ullrich et al. |
| 2011/0244963 | A1 | 10/2011 | Grant et al. |
| 2012/0068970 | A1* | 3/2012 | Pemberton-Pigott ... G06F 3/016 345/175 |
| 2012/0206246 | A1 | 8/2012 | Cruz-Hernandez et al. |
| 2012/0206247 | A1 | 8/2012 | Bhatia et al. |
| 2012/0306631 | A1 | 12/2012 | Hughes |
| 2013/0131851 | A1 | 5/2013 | Ullrich et al. |
| 2013/0194085 | A1 | 8/2013 | Grant et al. |
| 2013/0207917 | A1 | 8/2013 | Cruz-Hernandez et al. |
| 2013/0265286 | A1 | 10/2013 | Da Costa et al. |
| 2013/0267321 | A1 | 10/2013 | Burgess et al. |
| 2013/0335209 | A1 | 12/2013 | Cruz-Hernandez et al. |
| 2014/0002386 | A1 | 1/2014 | Rosenberg et al. |
| 2014/0064516 | A1 | 3/2014 | Cruz-Hernandez et al. |
| 2014/0118125 | A1 | 5/2014 | Bhatia |
| 2014/0315642 | A1 | 10/2014 | Grant et al. |

FOREIGN PATENT DOCUMENTS

| | | |
|---|---|---|
| CN | 104107539 A | 10/2014 |
| EP | 0864144 A2 | 9/1998 |
| EP | 2648071 A1 | 10/2013 |
| EP | 2796965 A2 | 10/2014 |
| WO | 2003032289 A1 | 4/2003 |
| WO | 2010065207 A1 | 6/2010 |

OTHER PUBLICATIONS

Mkwone, "Move FAQ—Playstation Forum", Sep. 3, 2010, XP055172297, http://community.eu.playstation.com/t5/PlayStation-Move/Move-FAQ/td-p/11447251.
Jamal Saboune et al., U.S. Appl. No. 14/020,461, filed Sep. 6, 2013.
Jamal Saboune et al., U.S. Appl. No. 14/020,502, filed Sep. 6, 2013.
Juan Manuel Cruz-Hernandez et al., U.S. Appl. No. 14/051,933, filed Oct. 11, 2013.
Juan Manuel Cruz-Hernandez et al., U.S. Appl. No. 14/078,438, filed Nov. 12, 2013.
Juan Manuel Cruz-Hernandez et al., U.S. Appl. No. 14/078,442, filed Nov. 12, 2013.
Juan Manuel Cruz-Hernandez et al., U.S. Appl. No. 14/078,445, filed Nov. 12, 2013.
Robert Lacroix et al., U.S. Appl. No. 14/277,870, filed May 15, 2014.
Satvir Singh Bhatia, U.S. Appl. No. 14/467,184, filed Aug. 25, 2014.
William Rihn, U.S. Appl. No. 14/538,955, filed Nov. 12, 2014.
Robert Lacroix et al., U.S. Appl. No. 14/539,111, filed Nov. 12, 2014.
Henry Da Costa et al., U.S. Appl. No. 14/539,122, filed Nov. 12, 2014.
Information that are not included with this Information Disclosure Statement can be found in U.S. Appl. No. 14/538,976.

* cited by examiner

US 9,814,974 B2

PERIPHERAL DEVICE WITH HAPTIC DIMINISHMENT PREVENTION COMPONENT

CROSS-REFERENCE TO RELATED APPLICATIONS

This application is a continuation of U.S. patent application Ser. No. 14/538,976, filed on Nov. 12, 2014, the specification of which is hereby incorporated by reference.

FIELD

One embodiment is directed generally to a device, and more particularly, to a device that produces haptic effects.

BACKGROUND

Video games and video game systems have become extremely popular. Video game devices or controllers typically use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify a user's interaction with a video game controller, or other electronic device. Specifically, vibration effects, or vibrotactile haptic effects, may be useful in providing cues to users of video game controllers or other electronic devices to alert the user to specific events, or provide realistic feedback to create greater sensory immersion within a simulated or virtual environment.

Other devices, such as medical devices, automotive controls, remote controls, and other similar devices where a user interacts with a user input element to cause an action, also benefit from haptic feedback or haptic effects. For example, and not by way of limitation, user input elements on medical devices may be operated by a user outside the body of a patient at a proximal portion of a medical device to cause an action within the patient's body at a distal end of the medical device. Haptic feedback or haptic effects may be employed to alert the user to specific events, or provide realistic feedback to the user regarding an interaction of the medical device with the patient at the distal end of the medical device.

SUMMARY

One embodiment is a system that modifies a haptic effect experienced at a user input element, where the user input element is positioned within the housing so that a first contact with the housing defines a first maximum range of a first movement of the user input element. The system receives a position of the user input element of a peripheral device, the peripheral device including a housing, a user input element, a haptic output device located within the housing and coupled to the user input element, and a haptic diminishment prevention component. The system further sends a haptic effect definition to the haptic output device in response to the received position of the user input element. The system further causes the haptic output device to output a force to the user input element of the peripheral device in response to the haptic effect definition. The system further causes the haptic diminishment prevention to define a first diminishment range of the first movement of the user input element, where the first diminishment range is less than the first maximum range and prevents the first contact with the housing.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
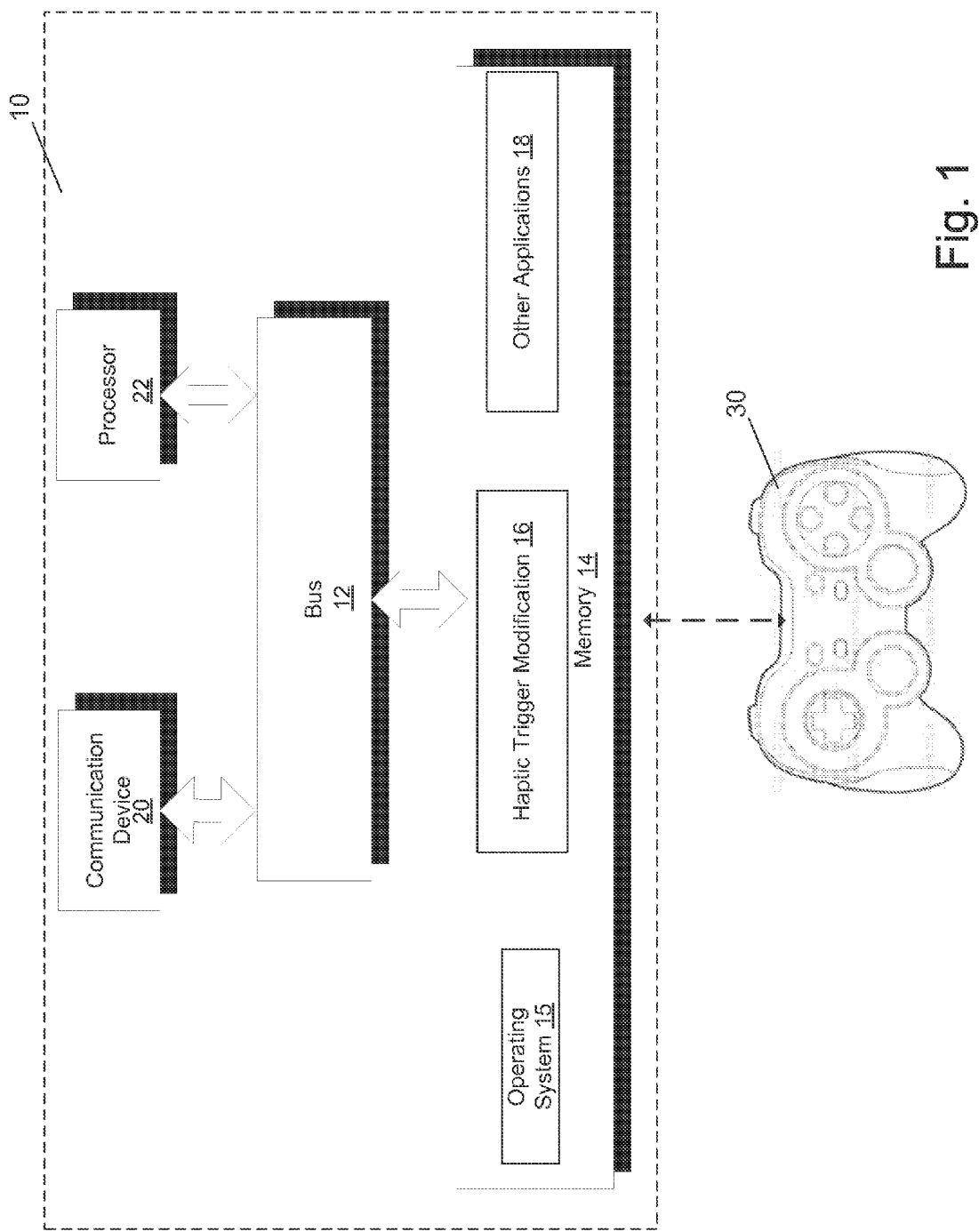
FIG. 1 illustrates a block diagram of a system in accordance with one embodiment of the invention.

In one embodiment, a peripheral device, such as a controller or gamepad, can be provided that produces haptic feedback, such as a trigger haptic effect, at a trigger, or other user input element, of the peripheral device. The peripheral device can include a housing, a trigger, a haptic output device, such as a motor or actuator, and one or more haptic diminishment prevention components, such as springs or frames. The peripheral device can receive haptic data, such as a haptic signal, from a processor. A haptic output device can output a force to a trigger in response to the received haptic data. A haptic diminishment prevention component can be positioned such that a range is created within the housing for the trigger to move in response to the force output by the haptic output device, when the trigger is in either a maximum open position outside of the range or a maximum closed position outside of the range. This range can be an open extended travel range when the trigger is in a maximum open position outside of the open extended travel range. This range can also be a closed extended travel range when the trigger is in a maximum closed position outside of the closed extended travel range. By creating the range, the haptic diminishment prevention component can increase a magnitude of the haptic feedback (e.g., trigger haptic effect) when the trigger is in either a maximum open position outside of the range or a maximum closed position outside of the range. In other words, the haptic diminishment prevention component can prevent the magnitude of the haptic feedback from being diminished when the trigger is in either a maximum open position outside of the range or a maximum closed position outside of the range. The haptic diminishment prevention component can also be identified as a haptic amplification component.

For example, when the haptic diminishment prevention component is a spring, the spring can be positioned to prevent the trigger from grounding against an outer portion of the housing. This creates an open extended travel range between the trigger and the outer portion of the housing. Thus, when a force is applied to the trigger when the trigger is in a maximum open position outside of the open extended travel range, the trigger can move within the created open extended travel range. As another example, when the haptic diminishment prevention component is a frame, the frame can be positioned to prevent the trigger from grounding against an inner portion of the housing when an object pushes or pulls the trigger by causing the object to ground against the frame rather than an outer portion of the housing. This creates a closed extended travel range between the trigger and the inner portion of the housing. Thus, when a force is applied to the trigger when the trigger is in a maximum closed position outside of the closed extended travel range, the trigger can move within the created closed extended travel range.

In another embodiment, the peripheral device can include a housing, a user input element (e.g., analog or digital stick, button, etc.), a haptic output device, such as a motor or actuator, and one or more haptic diminishment prevention components, such as springs or frames. The peripheral device can receive haptic data, such as a haptic signal, from a processor. A haptic output device can output a force to the user input element in response to the received haptic data. A haptic diminishment prevention component can be positioned such that a range is created within the housing for the user input element to move in response to the force output by the haptic output device, when the user input element is in either a maximum open position outside of the range or a maximum closed position outside of the range. By creating the range, the haptic diminishment prevention component can increase a magnitude of the haptic feedback (e.g., haptic effect) when the user input element is in either a maximum open position outside of the range or a maximum closed position outside of the range. In other words, the haptic diminishment prevention component can prevent the magnitude of the haptic feedback from being diminished when the user input element is in either a maximum open position outside of the range or a maximum closed position outside of the range.

FIG. 1 illustrates a block diagram of a system 10 in accordance with one embodiment of the invention. In one embodiment, system 10 is part of a device (e.g., a personal computer or console, such as a video game console), and system 10 provides a trigger haptic effect modification functionality for the device. In another embodiment, system 10 is separate from the device (e.g., personal computer or console), and remotely provides the aforementioned functionality for the device. Although shown as a single system, the functionality of system 10 can be implemented as a distributed system. System 10 includes a bus 12 or other communication mechanism for communicating information, and a processor 22 operably coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of an overall device in one embodiment. The modules further include a haptic trigger modification module 16 that modifies a haptic effect experienced at a trigger. In certain embodiments, haptic trigger modification module 16 can comprise a plurality of modules, where each module provides specific individual functionality for modifying a haptic effect experienced at a trigger. System 10 will typically include one or more additional application modules 18 to include additional functionality, such as peripheral firmware which can provide control functionality for a peripheral device, such as a controller 30.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

System 10 is operably connected to controller 30. Controller 30 is a peripheral device used to provide input to system 10. Controller 30 can be operably connected to system 10 using either a wireless connection or a wired connection. Controller 30 can further include a local processor which can communicate with system 10 using either a wireless connection or a wired connection. Alternatively, controller 30 may be configured to not include a local processor, and all input signals and/or output signals associated with controller 30 can be handled and processed directly by processor 22 of system 10.

Controller 30 can further include one or more digital buttons, one or more analog buttons, one or more bumpers, one or more directional pads, one or more analog or digital sticks, one or more driving wheels, and/or one or more user input elements that can be interacted with by a user, and that can provide input to system 10. Controller 30 can also include one or more analog or digital trigger buttons (or "triggers") that can further be interacted with by the user, and that can further provide input to system 10. As is described below in greater detail, controller 30 can further include a motor, or another type of actuator or haptic output device, configured to exert a bi-directional push/pull force on at least one trigger of controller 30.

Controller 30 can also include one or more actuators, or other types of haptic output devices. The local processor of controller 30, or, processor 22 in embodiments where controller 30 does not include a local processor, may transmit a haptic signal associated with a haptic effect to at least one actuator of controller 30. The actuator, in turn, outputs haptic effects such as vibrotactile haptic effects, kinesthetic haptic effects, or deformation haptic effects, in response to the haptic signal. The haptic effects can be experienced at a user input element (e.g., a digital button, analog button, bumper, directional pad, analog or digital stick, driving wheel, or trigger) of controller 30. Alternatively, the haptic effects can be experienced at an outer surface of controller 30. The actuator includes an actuator drive circuit. The actuator may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. An actuator is an example of a haptic output device, where a haptic output device is a device configured to output haptic effects, such as vibrotactile haptic effects, electrostatic friction haptic effects, or deformation haptic effects, in response to a drive signal. In alternate embodiments, the one or more actuators within controller 30 can be replaced by some other type of haptic output device.

Controller 30 can further include one or more speakers. The local processor of controller 30, or, processor 22 in embodiments where controller 30 does not include a local processor, may transmit an audio signal to at least one speaker of controller 30, which in turn outputs audio effects. The speaker may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

Controller 30 can further include one or more sensors. A sensor can be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. The sensor can further be configured to convert the detected energy, or other physical property, into an electrical signal, or any signal that represents virtual sensor information, and controller 30 can send the converted signal to the local processor of controller 30, or, processor 22 in embodiments where controller 30 does not include a local processor. The sensor can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, camera, or a light-dependent resistor.

Figure 2:
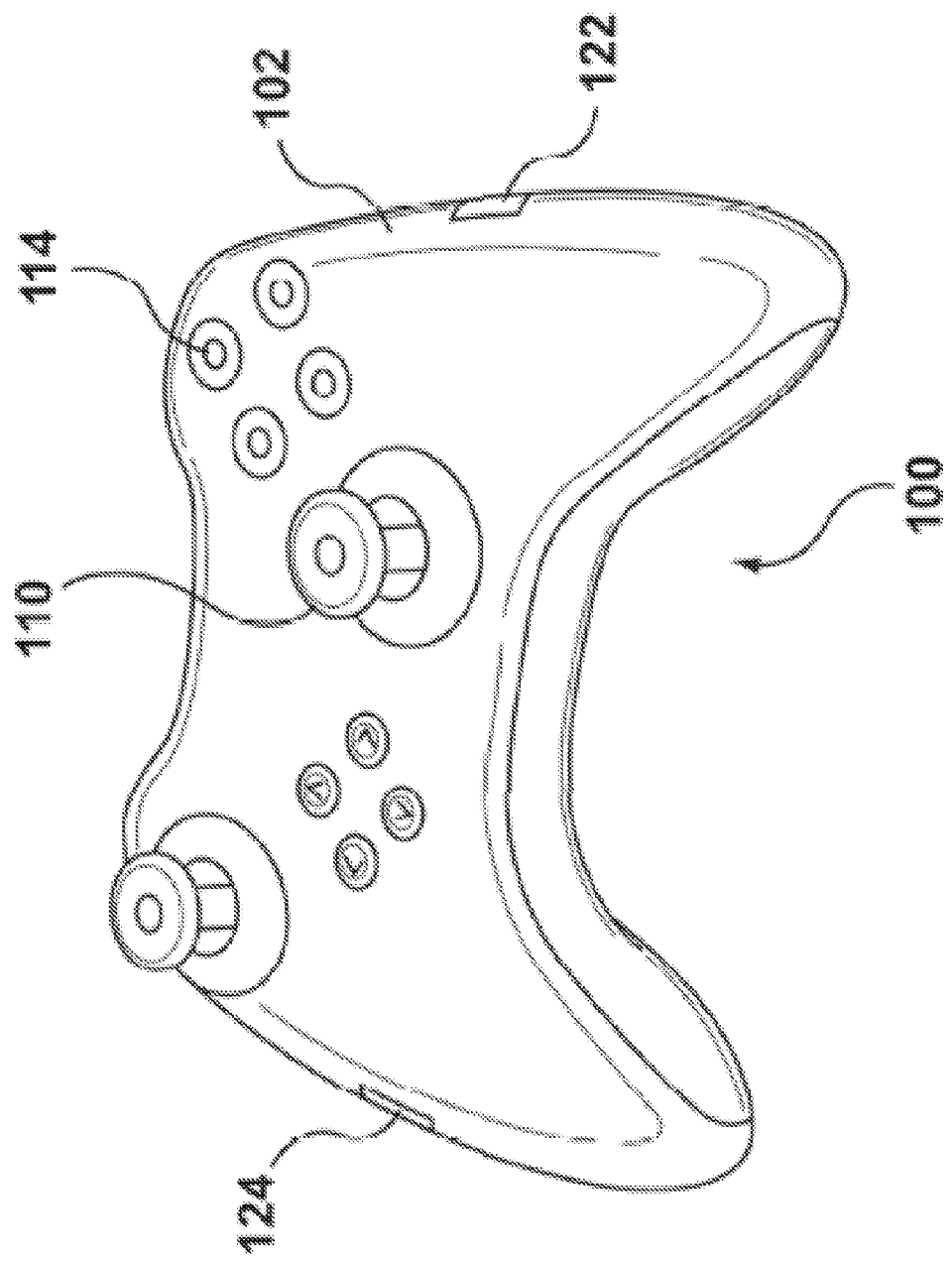
FIG. 2 illustrates a controller, according to an embodiment of the invention.
Figure 3:
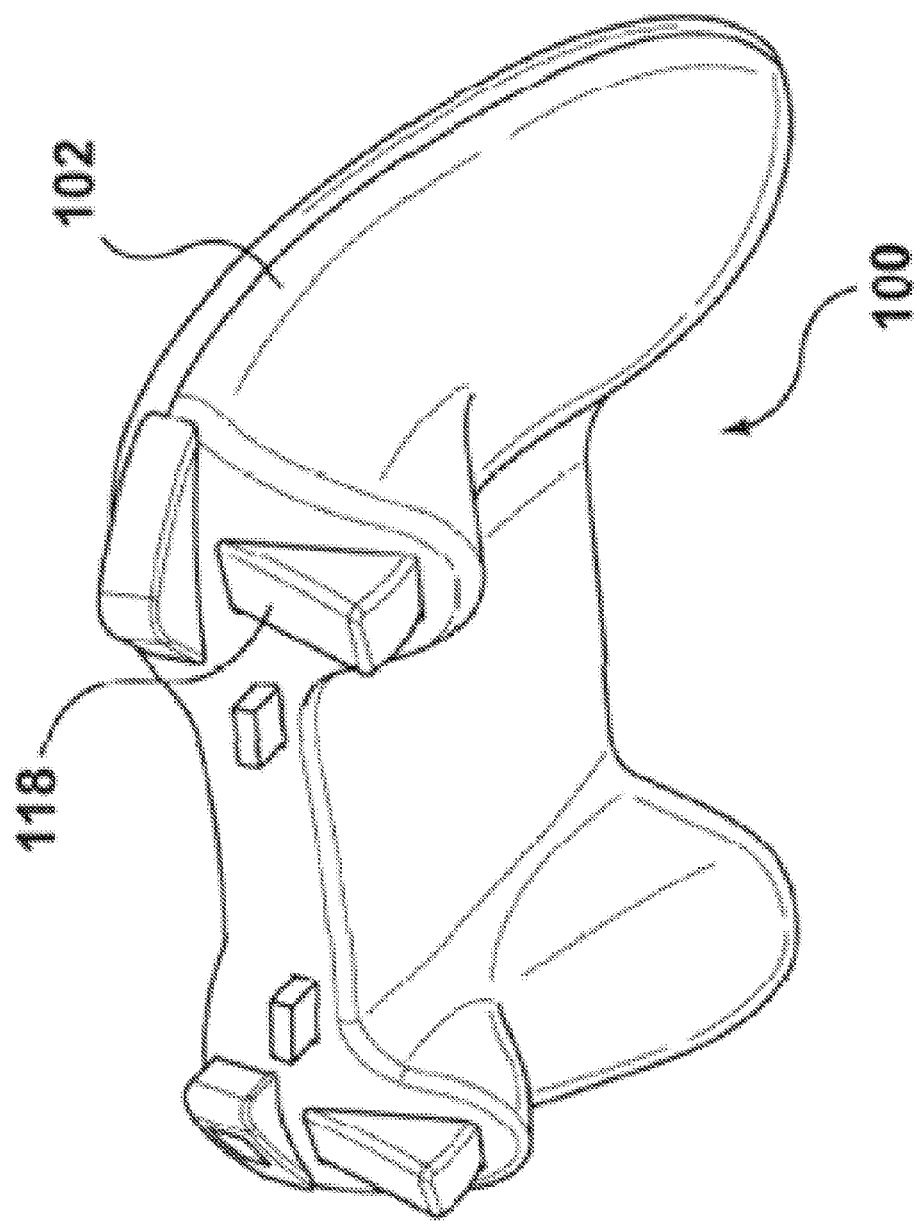
FIG. 3 illustrates another view of the controller of FIG. 2, according to an embodiment of the invention.

FIG. 2 illustrates a controller 100, according to an embodiment of the invention. In one embodiment, controller 100 is identical to controller 30 of FIG. 1. Further, FIG. 3 illustrates another view of controller 100. Controller 100 may be generally used with a gaming system that may be connected to a computer, mobile phone, television, or other similar device. Components of controller 100 illustrated in FIGS. 2 and 3 (i.e., housing 102, analog or digital stick 110, button 114, trigger 118, and rumble actuators 122 and 124) are further described below in greater detail in conjunction with FIG. 4.

Figure 4:
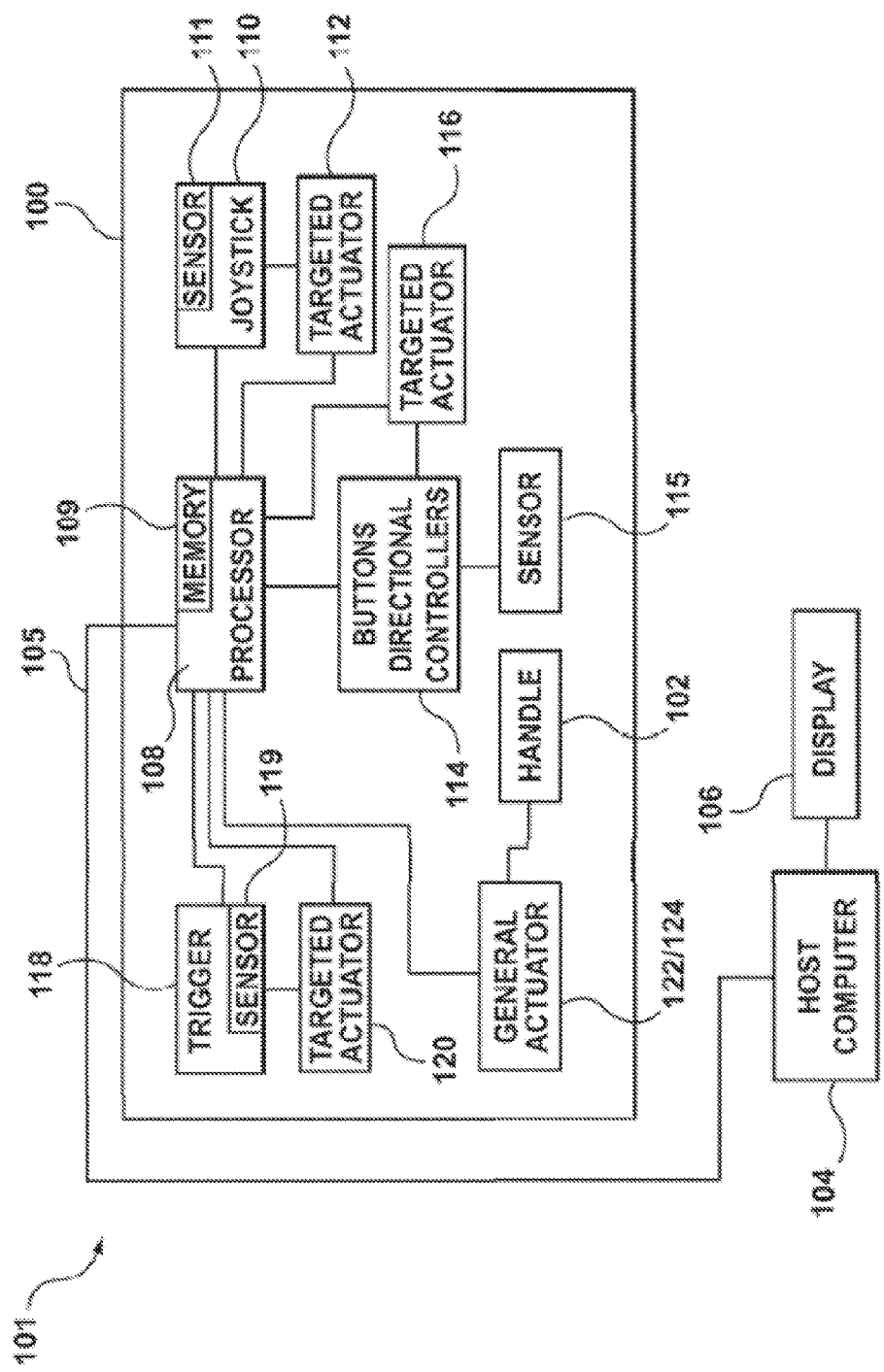
FIG. 4 illustrates a block diagram of a controller in conjunction with a host computer and display, according to an embodiment of the invention.

FIG. 4 illustrates a block diagram of controller 100 used in a gaming system 101 that further includes a host computer 104 and a display 106. As shown in the block diagram of FIG. 4, controller 100 includes a local processor 108 which communicates with host computer 104 via a connection 105. Connection 105 may be a wired connection, a wireless connection, or other types of connections known to those skilled in the art. Controller 100 may be alternatively configured to not include local processor 108, whereby all input/output signals from controller 100 are handled and processed directly by host computer 104. Host computer 104 is operably coupled to display screen 106. In an embodiment, host computer 104 is a gaming device console and display screen 106 is a monitor which is operably coupled to the gaming device console, as known in the art. In another embodiment, as known to those skilled in the art, host computer 104 and display screen 106 may be combined into a single device.

A housing 102 of controller 100 is shaped to easily accommodate two hands gripping the device, either by a left-handed user or a right-handed user. Those skilled in the art would recognize that controller 100 is merely an example embodiment of a controller of similar shape and size to many "gamepads" currently available for video game console systems, such as a Microsoft® Xbox One™ controller or a PlayStation® DualShock™ controller, and that controllers with other configurations of user input elements, shapes, and sizes may be used, including but not limited to controllers such as a Wii™ remote or Wii™ U Controller, Sony® SixAxis™ controller or Sony® Wand controller, as well as controllers shaped as real life objects (such as tennis rackets, golf clubs, baseball bats, and the like) and other shapes, or controllers with a display or head-mounted display.

Controller 100 includes several user input elements, including an analog or digital stick 110, a button 114, and a trigger 118. As used herein, user input element refers to an interface device such as a trigger, button, analog or digital stick, or the like, which is manipulated by the user to interact with host computer 104. As can be seen in FIGS. 2 and 3, and as known to those skilled in the art, more than one of each user input element and additional user input elements may be included on controller 100. Accordingly, the present description of a trigger 118, for example, does not limit controller 100 to a single trigger. Further, the block diagram of FIG. 4 shows only one (1) of each of analog or digital stick 110, button 114, and trigger 118. However, those skilled in the art would understand that multiple analog or digital sticks, buttons, and triggers, as well as other user input elements, may be used, as described above.

As can be seen in the block diagram of FIG. 4, controller 100 includes a targeted actuator or motor to directly drive each of the user input elements thereof as well as one or more general or rumble actuators 122, 124 operably coupled to housing 102 in a location where a hand of the user is generally located. More particularly, analog or digital stick 110 includes a targeted actuator or motor 112 operably coupled thereto, button 114 includes a targeted actuator or motor 116 operably coupled thereto, and trigger 118 includes a targeted actuator or motor 120 operably coupled thereto. In addition to a plurality of targeted actuators, controller 100 includes a position sensor operably coupled to each of the user input elements thereof. More particularly, analog or digital stick 110 includes a position sensor 111 operably coupled thereto, button 114 includes a position sensor 115 operably coupled thereto, and trigger 118 includes a position sensor 119 operably coupled thereto. Local processor 108 is operably coupled to targeted actuators 112, 116, 120 as well as position sensors 111, 115, 119 of analog or digital stick 110, button 114, and trigger 118, respectively. In response to signals received from position sensors 111, 115, 119, local processor 108 instructs targeted actuators 112, 116, 120 to provide directed or targeted kinesthetic effects directly to analog or digital stick 110, button 114, and trigger 118, respectively. Such targeted kinesthetic effects are discernible or distinguishable from general or rumble haptic effects produced by general actuators 122, 124 along the entire body of the controller. The collective haptic effects provide the user with a greater sense of immersion to the game as multiple modalities are being simultaneously engaged, e.g., video, audio, and haptics. Further details of a controller configured to produce haptics is described in greater detail in application Ser. No. 14/258,644, filed Apr. 22, 2014, entitled "GAMING DEVICE HAVING A HAPTIC-ENABLED TRIGGER," herein incorporated by reference in its entirety.

Figure 5:
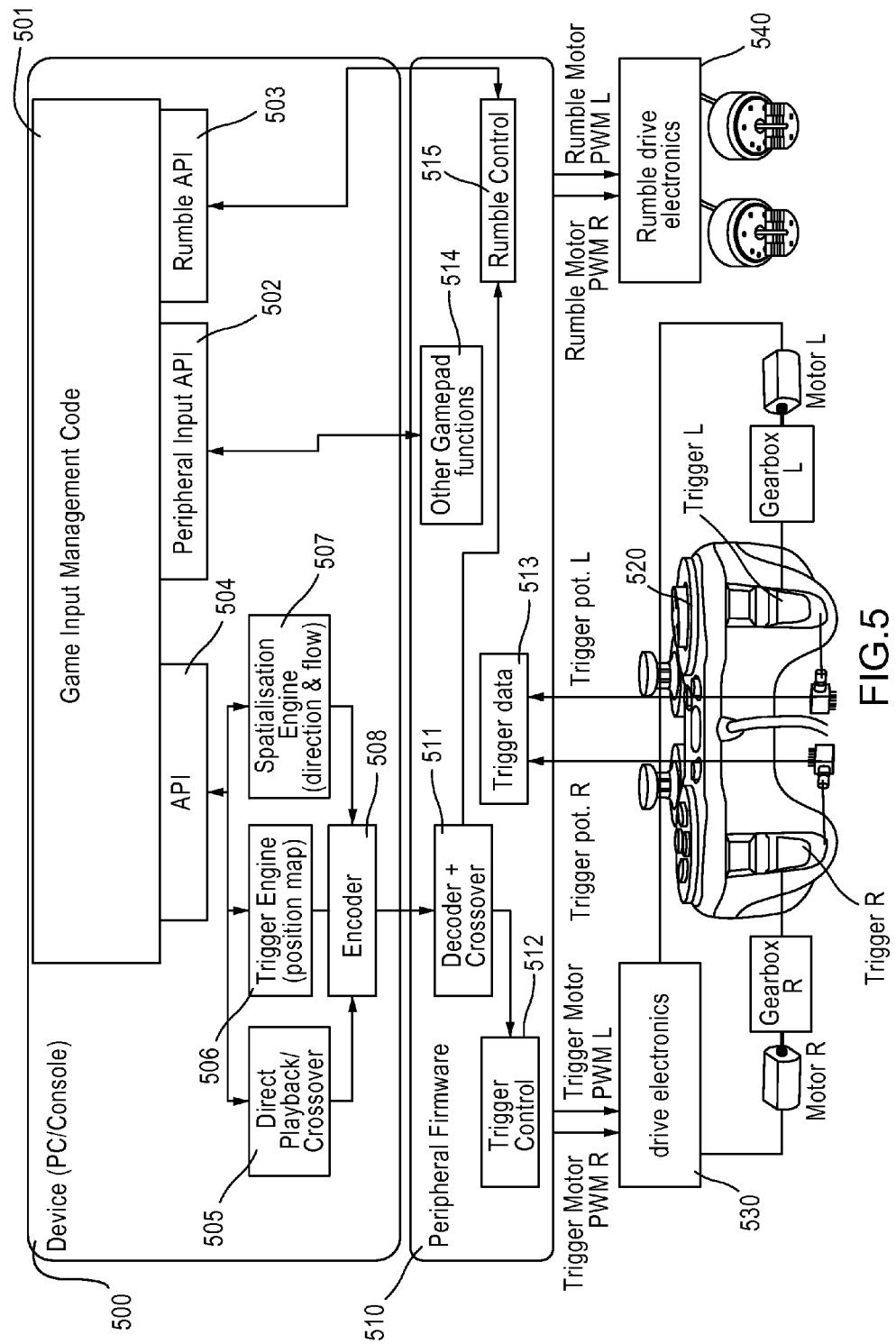
FIG. 5 illustrates a block diagram of a trigger haptic effect software stack for a system, according to an embodiment of the invention.

FIG. 5 illustrates a block diagram of a trigger haptic effect software stack for a system, according to an embodiment of the invention. The trigger haptic effect software stack is implemented on a system, such as system 10 of FIG. 1. In the illustrated embodiment, the system includes the following components: device 500, peripheral firmware 510, and controller 520. Device 500 can be any type of computer device, such as a personal computer, tablet, smartphone, or console (e.g., video game console). Peripheral firmware 510 is firmware for one or more peripheral devices (e.g., controllers) that can be operably connected to device 500. Controller 520 is an example of a peripheral that is operably connected to device 500. Controller 520 can be a video game controller. In one embodiment, controller 520 can be identical to controller 30 of FIG. 1, and controller 100 of FIGS. 2, 3, and 4.

Device 500 includes game input management code 501. Game input management code 501 includes a set of computer-readable instructions that manage input provided by controller 520 in the context of a game application, or other type of application, executed within device 500. Device 500 further includes peripheral input application programming interface ("API") 502. Peripheral input API 502 includes a set of computer-readable functions or routines that allow game input management code 501 to interact with peripheral firmware 510 in order to receive and manage input provided by controller 520. Device 500 further includes rumble API 503. Rumble API includes a set of computer-readable functions or routines that allow game input management code 501 to interact with peripheral firmware 510 in order to transmit rumble instructions to one or more rumble motors, or rumble actuators, of controller 520 (e.g., rumble motors L and R, as illustrated in FIG. 5). A rumble instruction can cause a rumble motor, or rumble actuator, of controller 520 to produce a general or rumble haptic effect.

Device 500 further includes trigger haptic effect API 504 (identified in FIG. 5 as "API"). Trigger haptic effect API 504 includes a set of computer-readable functions or routines that are exposed to game input management code 501, and that allow game input management code 501 to interact with peripheral firmware 510 in order to transmit haptic instructions to controller 520, such as trigger instructions to one or more triggers of controllers 520 (e.g., triggers L and R, as illustrated in FIG. 5). A haptic instruction can cause one or more targeted motors, or targeted actuators, of controller 520 to produce a haptic effect at one or more user input elements of controllers 520. A trigger instruction is a specific type of haptic instruction that can cause one or more targeted motors, or targeted actuators, of controller 520 (e.g., motors L and R, as illustrated in FIG. 5) to produce a trigger haptic effect at one or more triggers of controllers 520 (e.g., triggers L and R, as illustrated in FIG. 5). A trigger haptic effect is a specific type of haptic effect that is experienced at a trigger of a controller, such as controller 520. Trigger haptic effect API 504 can store one or more trigger haptic effect definitions. A haptic effect definition is a data structure that includes haptic data, such as a haptic signal, that is predefined and that can be stored within a storage, such as a haptic file or haptic stream, and that can be sent to one or more rumble motors, rumble actuators, targeted motors, or targeted actuators, to produce a haptic effect at a component, or user input element, of controller 520. The haptic data can include one or more attributes of the corresponding haptic effect, where the attributes can be stored as parameters. Example parameters of a haptic effect definition include an amplitude parameter, a frequency parameter, a waveform parameter, an envelope parameter, a magnitude (or strength) parameter, and a duration parameter. A trigger haptic effect definition is a specific type of haptic effect definition that can be sent to one or more motors, or actuators, of controller 520 (e.g., motors L and R, as illustrated in FIG. 5) to produce a trigger haptic effect at one or more triggers of controllers 520 (e.g., triggers L and R, as illustrated in FIG. 5).

According to the embodiment, trigger haptic effect API 504 can allow game input management code 501 to interact with direct playback/crossover 505, trigger engine 506, and spatialization engine 507, and can further manage direct playback/crossover 505, trigger engine 506, and spatialization engine 507 according to requests invoked by game input management code 501. Further, trigger haptic effect API 504 can store data required for communication with peripheral firmware 510, and required for generation of one or more trigger haptic effects. In an alternate embodiment, trigger haptic effect API 504 can reside within peripheral firmware 510 rather than device 500.

Device 500 further includes direct playback/crossover 505. Direct playback/crossover 505 receives haptic data as input, produces haptic data as output, and transmits haptic data to one or more targeted motors, or targeted actuators, of controller 520 (e.g., motors L and R, as illustrated in FIG. 5). In certain embodiments, direct playback/crossover 505 can output the input haptic data directly, without modifying a format of the input haptic data. This results in an "as-is" playback of the input haptic data. In other embodiments, direct playback/crossover 505 can convert the haptic data that is input from a first format to a second format, and can further output the converted haptic data. Depending on the type of playback, direct playback/crossover 505 can optionally use a programmable crossover to convert the haptic data. By converting the haptic data, device 500 can "deconstruct" the haptic effect and playback the haptic effect at multiple actuators faithfully. In one embodiment, the format of the haptic data can be a Haptic Elementary Stream ("HES") format. A HES format is a file or data format for representing haptic data that can be streamed to a device. The haptic data can be represented in a manner that is identical or similar to how uncompressed sound is represented, although the haptic data can be encrypted within the HES format. In an alternate embodiment, direct playback/crossover 505 can reside within peripheral firmware 510 rather than device 500.

Device 500 further includes trigger engine 506. Trigger engine 506 can receive haptic data, such as a trigger haptic effect definition, and can modify the haptic data based on data, such as trigger data (e.g., trigger data 513 as illustrated in FIG. 5) received from controller 520. Trigger data is data that includes one or more parameters that indicate a position and/or range of one or more triggers of controller 520 (e.g., triggers L and R as illustrated in FIG. 5). Trigger engine 506 can further transmit haptic instructions to controller 520. For example, trigger engine 506 can transmit trigger instructions to one or more triggers of controller 520 (e.g., triggers L and R, as illustrated in FIG. 5). As previously described, a trigger instruction can cause one or more targeted motors, or targeted actuators, of controller 520 (e.g., motors L and R, as illustrated in FIG. 5) to produce a trigger haptic effect at one or more triggers of controllers 520 (e.g., triggers L and R, as illustrated in FIG. 5). Thus, in one embodiment, by modifying the haptic data of the trigger haptic effect definition, trigger engine 506 can cause a specific trigger haptic effect to be experienced at a trigger based on a position and/or range of the trigger. In another embodiment, by modifying the haptic data of the trigger haptic effect definition, trigger engine 506 can scale a trigger haptic effect for one or more targeted motors, or targeted actuators, of controller 520 (e.g., motors L and R, as illustrated in FIG. 5) based on a position and/or range of the trigger. Trigger engine 506 can further store one or more haptic effect definitions, such as trigger haptic effect definitions. In an alternate embodiment, trigger engine 506 can reside within peripheral firmware 510 rather than device 500.

Device 500 further includes spatialization engine 507 (identified in FIG. 5 as "spatialisation engine"). Spatialization engine 507 can receive haptic data, such as a trigger haptic effect definition, and can modify the haptic data based on spatialization data. Spatialization data can include data that indicates a desired direction and/or flow of a haptic effect, such as a trigger haptic effect. In certain embodiments, spatialization engine 507 can receive spatialization data that includes a direction and/or flow from game input management code 501. Further, spatialization data can also include one or more positions of one or more hands of a user located on controller 520. In certain embodiments, spatialization engine 507 can receive spatialization data that includes one or more hand positions from controller 520. Further, in certain embodiments, spatialization engine 507 can receive spatialization data that includes a position of a user's character within a game application as communicated by game input management code 501.

According to the embodiment, spatialization engine 507 can modify the haptic data so that a haptic effect, such as a trigger haptic effect, is scaled for one or more rumble motors, or rumble actuators, of controller 520 (e.g., rumble motors L and R, as illustrated in FIG. 5), and that the haptic effect is also scaled for one or more targeted motors, or targeted actuators, of controller 520 (e.g., motors L and R, as illustrated in FIG. 5). In other words, spatialization engine 507 can modify the haptic data that is sent to each motor or actuator, and thus, modify the haptic effect that is experienced at each motor or actuator, in order to convey a sense of direction and flow of an overall haptic effect. For example, in order to emphasize a haptic effect experienced at a motor or actuator, spatialization engine 507 may scale one or more portions of the haptic effect. For example, spatialization engine 507 may scale haptic data that is sent to the motor or actuator that causes the haptic effect to be experienced, causing the haptic effect to be more pronounced (e.g., increased magnitude, duration, etc.). Additionally, spatialization engine 507 may scale haptic data that is sent to other motors or actuators, causing other haptic effects that are experienced at those motors or actuators to be less pronounced (e.g., decreased magnitude, duration, etc.). In certain embodiments, spatialization engine 507 can modify the haptic data in real-time. Further, in certain embodiments, spatialization engine 507 can have non-linear relationships between inputs and motor, or actuator, outputs in order to exaggerate an overall trigger haptic effect. In an alternate embodiment, spatialization engine 507 can reside within peripheral firmware 510 rather than device 500.

Device 500 further includes encoder 508. Encoder 508 encodes haptic data received from direct playback/crossover 505, trigger engine 506, and/or spatialization engine 507 into a format. In one embodiment, the format can be an HES format. Encoder 508 further transmits the encoded haptic data to peripheral firmware 510.

Peripheral firmware 510 includes decoder and crossover 511. Decoder and crossover 511 receives the encoded haptic data from encoder 508 and decodes the encoded haptic data. In certain embodiments, decoder and crossover 511 computes a programmable crossover in order to decode the encoded haptic data. In some of these embodiments, decoder and crossover 511 computes the programmable crossover in real-time. Peripheral firmware 510 further includes trigger control 512. Trigger control 512 is a low-level control API for one or more targeted motors, or targeted actuators, of controller 520 (e.g., motors L and R, as illustrated in FIG. 5). Trigger control 512 can receive a trigger instruction from device 500, can convert the trigger instruction into a low-level trigger instruction for a specified targeted motor, or targeted actuator, of controller 520, and can transmit the low-level trigger instruction to the specified targeted motor, or targeted actuator, of controller 520. The low-level trigger instruction can cause the specified targeted motor, or targeted actuator, to produce a trigger haptic effect at a specified trigger of controller 520.

Peripheral firmware 510 further includes trigger data 513. Trigger data 513, as previously described, is data that includes one or more parameters that indicate a position and/or range of one or more triggers of controller 520 (e.g., triggers L and R as illustrated in FIG. 5). Trigger data 513 can be received from controller 520 by peripheral firmware 510. Peripheral firmware 510 can further store trigger data 513, and can further transmit trigger data 513 to device 500. Peripheral firmware 510 further includes other gamepad functions 514, which are functions of controller 520 that can be managed by peripheral firmware 510. Such functions can include such functions as wired/wireless communications, input reporting, protocol implementation, power management, etc. Peripheral firmware 510 further includes rumble control 515. Rumble control 515 is a low-level control API for one or more rumble motors, or rumble actuators, of controller 520 (e.g., rumble motors L and R, as illustrated in FIG. 5). Rumble control 515 can receive a rumble instruction from device 500, can convert the rumble instruction into a low-level rumble instruction for a specified rumble motor, or rumble actuator, of controller 520, and can transmit the low-level trigger instruction to the specified rumble motor, or rumble actuator, of controller 520.

Controller 520 includes triggers L and R. Controller 520 further includes gear boxes L and R and motors L and R. Motor L and gearbox L are operably coupled to trigger L within controller 520. Likewise, motor R and gearbox R are operably coupled to trigger R within controller 520. When motor L receives a trigger instruction, motor L and gearbox L collectively cause a trigger haptic effect to be experienced at trigger L. Likewise, when motor R receives a trigger instruction, motor R and gearbox R collectively cause a trigger haptic effect to be experienced at trigger R. According to the embodiment, peripheral firmware 510 sends trigger instructions to motors L and R of controller 520 using drive electronics 530. Controller 520 further includes potentiometers L and R. Potentiometer L can detect a position and/or range of trigger L, and can further send the detected position and/or range of trigger L to peripheral firmware 510 as trigger data. Likewise, potentiometer R can detect a position and/or range of trigger R, and can further send the detected position and/or range of trigger R to peripheral firmware 510 as trigger data. In one embodiment, potentiometers L and R can each be replaced with another type of position sensor, such as a hall effect sensor. Controller 520 further includes rumble motors L and R. When rumble motor L receives a rumble instruction, rumble motor L causes a haptic effect to be experienced along a left body of controller 520. Likewise, when rumble motor R receives a rumble instruction, rumble motor R cause a haptic effect to be experienced along a right body of controller 520. According to the embodiment, peripheral firmware 510 sends rumble instructions to rumble motors L and R of controller 520 using rumble drive electronics 530.

In an alternate embodiment, one or more targeted motors, or targeted actuators, can be operably coupled to one or more user input elements (such as one or more digital buttons, one or more analog buttons, one or more bumpers, one or more directional pads, one or more analog or digital sticks, one or more driving wheels) of controller 520. According to the alternate embodiment, peripheral firmware 510 can sends instructions to the one or more targeted motors or targeted actuators, causing the one or more targeted motors or targeted actuators to produce haptic effects that are experienced at the one or more user input elements of controller 520.

As previously described, a controller, gamepad, or other peripheral device, can include one or more general or rumble motors or actuators, and one or more targeted motors or actuators. Such a controller can produce spatialization haptic effects, which are haptic effects where localized haptic feedback can be experienced on the controller. For example, a user can perceive localized haptic effects that are played at one or more triggers of the controller while resting their fingers on the one or more triggers. These localized haptic effects can be distinct from more general haptic effects that can be played within a housing of the controller, and that can be more generally perceived by the user's hands while holding the controller. In one example, within a gaming application, a user's in-game character may be hit with a "sorcerer's spell." In conjunction with the visual representation of the spell displayed within the gaming application, a localized haptic effect can first be experienced at a trigger by the user, and a more general haptic effect can subsequently be experienced at the controller by the user.

A trigger can be housed within a housing of a controller, or other type of peripheral device. The trigger can extend, possibly outside of the housing, so that it makes contact with an outer rotational hard stop, or some other outer portion of the housing. More specifically, the trigger can be extended, possibly by a spring, and can make contact with the outer rotational hard stop, or some other outer portion of the housing. When an object (e.g., a user's finger) moves (e.g., pulls or pushes) the trigger, the trigger can rotate, or otherwise move, into the housing until it makes contact with an inner rotational hard stop, or some other inner portion of the housing, while still being in contact with the object. When a targeted motor or actuator, or some other type of haptic output device, applies a force to the trigger, the trigger can rotate, or otherwise move. This rotation, or other type of movement, can be towards an outer rotational hard stop or away from the outer rotational hard stop.

Using a standard trigger design in a controller, however, can result in a diminished haptic feedback sensation when the trigger is either in a maximum open position or a maximum closed position. A maximum open position of a trigger is a position of the trigger when little or no force is applied to the trigger, such that the trigger has not begun to rotate, or otherwise move, into the housing. A maximum open position can also be identified as a "resting position." In a maximum open position, the trigger can be grounded against an outer rotational hard stop, or some other outer portion of the housing, of the controller. This can provide the trigger with little to no space to rotate, or otherwise move, in response to a force that is produced by a targeted motor or actuator and that is applied to the trigger.

A maximum closed position of a trigger is a position of the trigger when a force is applied to the trigger, such that the trigger has rotated, or otherwise moved, a maximum distance into the housing. Similar to a maximum open position, in a maximum closed position the trigger can be grounded against an inner rotational hard stop, or some other inner portion of the housing, of the controller. This can also provide the trigger with little to no space to rotate, or otherwise move, in response to a force that is produced by a targeted motor or actuator and applied to the trigger. This lack of ability to move in either the maximum open position or the maximum closed position can reduce a magnitude of, or otherwise dampen, a haptic feedback sensation experienced at the trigger.

Thus, in one embodiment, a peripheral device can also include one or more haptic diminishment prevention components, such as one or more springs, one or more frames, or a combination of the two. A haptic diminishment prevention component can increase a magnitude of a trigger haptic effect experienced at a trigger when the trigger is in a maximum open position outside of an open extended travel range created by the haptic diminishment prevention component. This is further described below in greater detail in conjunction with FIG. 6. Further, a haptic diminishment prevention component can increase a magnitude of a trigger haptic effect experienced at a trigger when the trigger is in a maximum closed position outside of a closed extended travel range created by the haptic diminishment prevention component. This is further described below in greater detail in conjunction with FIG. 7. Thus, in accordance with an embodiment, in addition to a maximum open position and a maximum closed position, two new positions are further defined: a maximum open position outside an open extended travel range; and a maximum closed position outside a closed extended travel range. A maximum open position outside an open extended travel range is identical to a maximum open position, except that the maximum open position outside the open extended travel range is positioned by a haptic diminishment prevention component so that it is not positioned within an open extended travel range. A maximum closed position outside a closed extended travel range is identical to a maximum closed position, except that the maximum closed position outside the closed extended travel range is positioned by a haptic diminishment prevention component so that it is not positioned within a closed extended travel range. A maximum open position outside an open extended travel range and a maximum closed position outside a closed extended travel range are further described below in greater detail in conjunction with FIG. 9. In an alternate embodiment, the trigger can be replaced with another type of user input element (e.g., a button, bumper, directional pad, analog or digital stick, driving wheel), and the trigger haptic effect can be replaced with a more general haptic effect. In this alternate embodiment, the haptic diminishment prevention component can increase a magnitude of the haptic effect experienced at the user input element.

Figure 6:
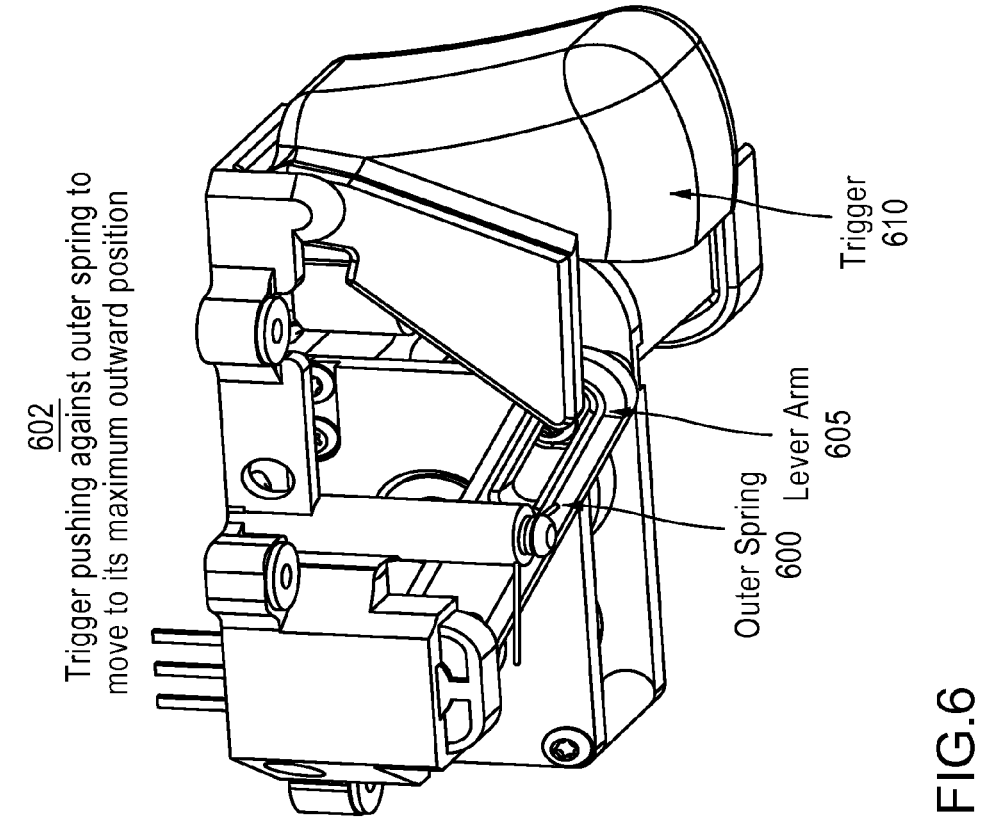
FIG. 6 illustrates a controller that includes an outer spring that creates an open extended travel range for a trigger to move within when the trigger is in a maximum open position outside of the open extended travel range, according to an embodiment of the invention.
Figure 6:
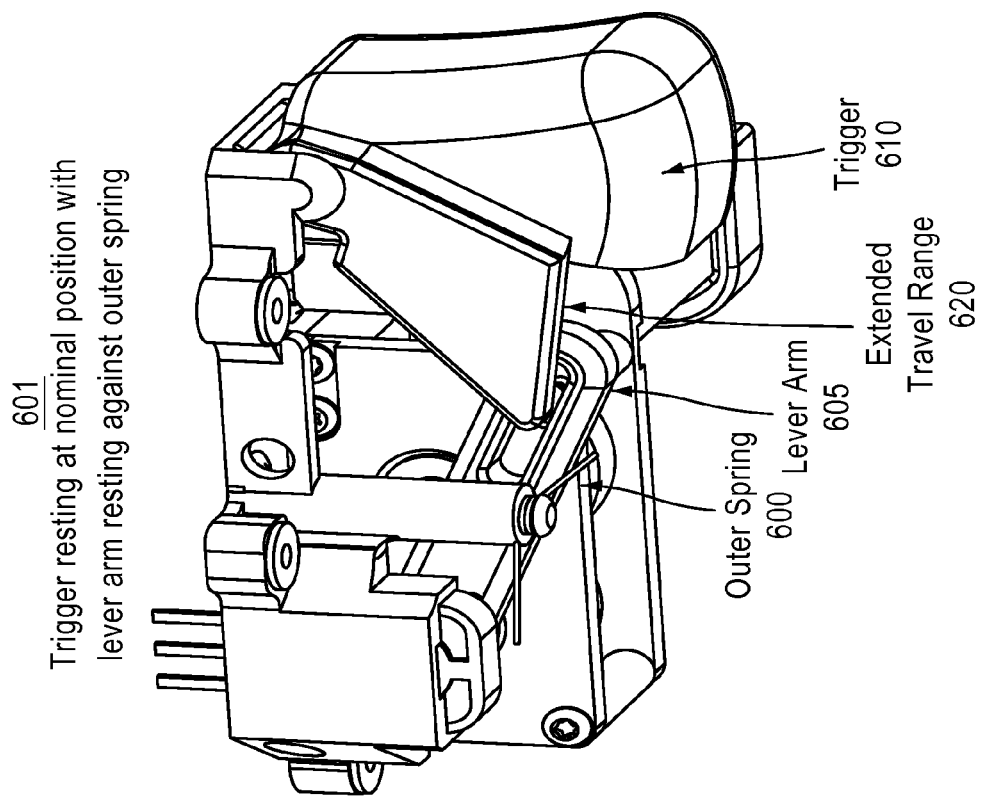

FIG. 6 illustrates a controller that includes an outer spring 600 that creates an open extended travel range 620 for a trigger 610 to move within when trigger 610 is in a maximum open position outside of open extended travel range 620, according to an embodiment of the invention. More specifically, FIG. 6 illustrates a controller that includes outer spring 600 that holds trigger 610 in a maximum open position outside of open extended travel range 620. When a force is applied to trigger 610, outer spring 600 can allow trigger 610 to rotate, or otherwise move, to open extended travel range 620. FIG. 6 includes views 601 and 602. In view 601, trigger 610 is in a maximum open position outside of open extended travel range 620, as trigger 610 can be pulled or pushed along an axis that is perpendicular to the illustrated plane of FIG. 6. In view 602, trigger 610 is in a maximum open position that is inside open extended travel range 620, where trigger 610 is further extended within open extended travel range 620, as trigger 610 can be pulled back in, but cannot be pushed out further along an axis that is perpendicular to the illustrated plane of FIG. 6. In the illustrated embodiment, outer spring 600 is an example of a haptic diminishment prevention component, and is positioned between trigger 610 and an outer rotational hard stop, or an outer portion of a housing of the controller. A maximum open position outside of an extended travel range can be important for spatialization as a user can be lightly resting their fingers on triggers of a controller when receiving spatialization haptic effects. In order to increase a magnitude of a trigger haptic effect when a trigger (such as trigger 610) is in a maximum open position outside of an open extended travel range (such as open extended travel range 620), the trigger can be offset with an outer spring (such as outer spring 600) so that, when in the maximum open position outside of an open extended travel range, the trigger is able to move within the extended travel range in response to a force that is applied to the trigger.

View 601 is a view of the controller where outer spring 600 holds trigger 610 in a position such that trigger 610 is not resting at, or otherwise making contact with, an outer rotational hard stop, or an outer portion of a housing of the controller, when trigger 610 is in a maximum open position outside of open extended travel range 620. In other words, outer spring 600 creates open extended travel range 620, where open extended travel range 620 is a range that trigger 610 can rotate, or otherwise move, within, in response to a force that is produced by a targeted motor or actuator and applied to trigger 610. By creating open extended travel range 620, outer spring 600 can prevent trigger 610 from grounding on the outer rotational hard stop, or the outer portion of the housing, when trigger 610 rotates, or otherwise moves, in response to the force that is applied to trigger 610. This can increase a magnitude of a trigger haptic effect (e.g., kinesthetic haptic effect) experienced at trigger 610. In the illustrated embodiment, outer spring 600 is a cantilever spring that includes lever arm 605, where lever arm 605 pushes against, or otherwise makes contact with, trigger 610 to hold trigger 610 in the aforementioned position. In an alternate embodiment, outer spring 600 can be a compression spring, bias spring, or some other type of spring, that pushes against, or otherwise makes contact with, trigger 610.

View 602 is a view of the controller where a targeted motor or actuator applies a force to trigger 610, and trigger 610 rotates, or otherwise moves, in response to the force. As illustrated in view 602 of FIG. 6, trigger 610 rotates, or otherwise moves, into open extended travel range 620, and occupies at least a portion of open extended travel range 620. In the illustrated embodiment, trigger 610 pushes against, or otherwise makes contact with, lever arm 605. This moves lever arm 605 so that trigger 610 can rotate, or otherwise move, into extended travel range 620. In an alternate embodiment where outer spring 600 is a compression spring, bias spring, or another type of spring, trigger 610 can push against, or otherwise make contact with, outer spring 600, which can move outer spring 600 so that trigger 610 can rotate, or otherwise move, into open extended travel range 620.

In an alternate embodiment, outer spring 600 can be replaced with an inner spring. The inner spring can be positioned between trigger 610 and an inner rotational hard stop, or an inner portion of a housing of the controller. Further, the inner spring can pull trigger 610 such that trigger 610 is not resting at, or otherwise making contact with, an outer rotational hard stop, or an outer portion of a housing of the controller (i.e., such that extended travel range 620 is created). In this alternate embodiment, a stiffness of inner spring can be calculated in order to avoid pulling trigger 610 so that trigger 610 is resting at, or otherwise making contact with, an inner rotational hard stop, or an inner portion of a housing of the controller.

Figure 7:
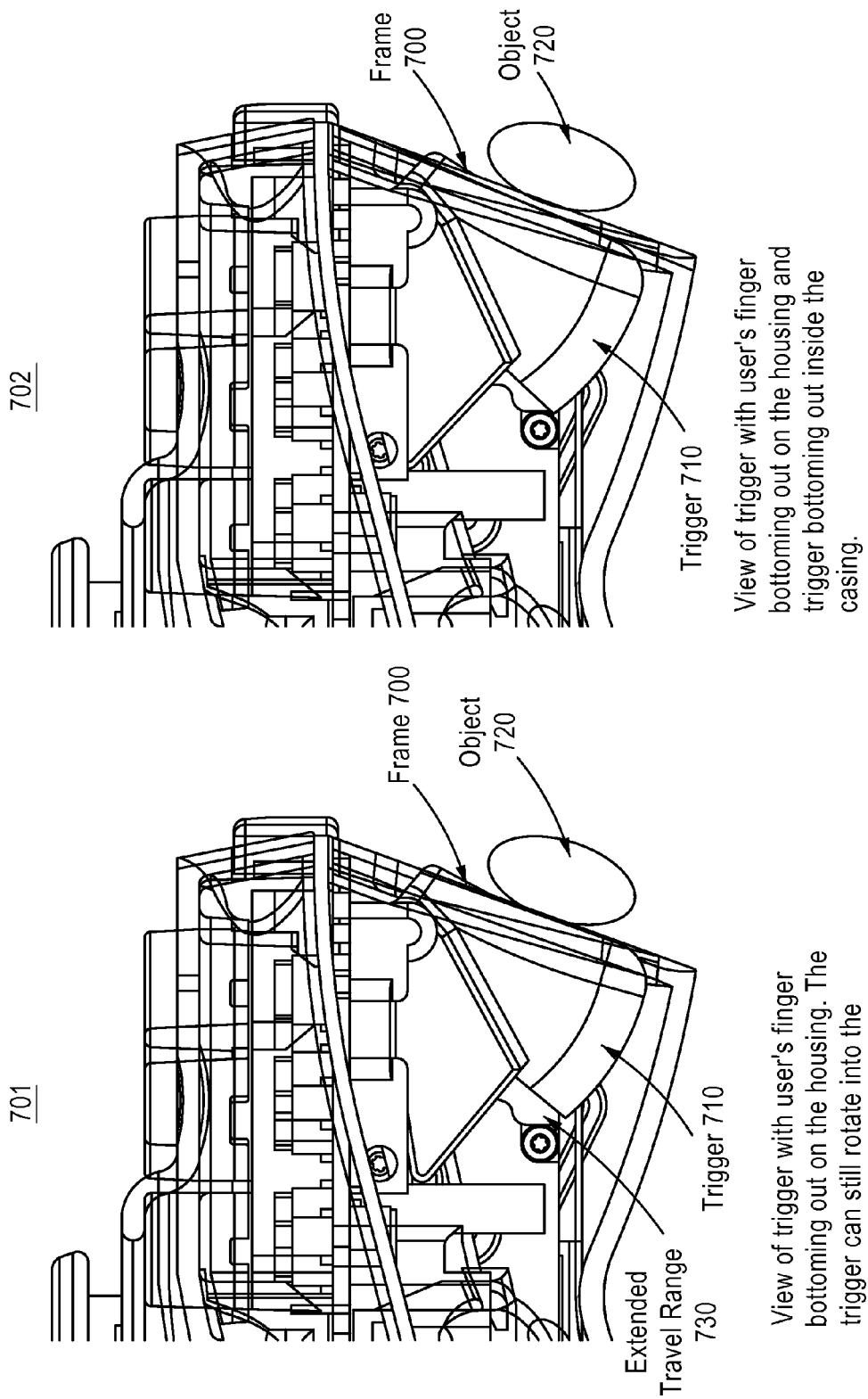
FIG. 7 illustrates a controller that includes an extended frame that that creates a closed extended travel range for a trigger to move within when the trigger is in a maximum closed position outside of the closed extended travel range, according to an embodiment of the invention.

FIG. 7 illustrates a controller that includes an extended frame 700 that creates a closed extended travel range 730 for a trigger 710 to move within when trigger 710 is in a maximum closed position outside of closed extended travel range 730, according to an embodiment of the invention. In the illustrated embodiment, extended frame 700 is an example of a haptic diminishment prevention component, and is an extension of an outer portion of a housing of the controller. As previously described, in a standard trigger design, a trigger haptic effect can be greatly diminished when a trigger (such as trigger 710) is a maximum closed position (e.g., when a user fully presses the trigger so that the trigger is grounded to an inner portion of a housing). In order to increase a magnitude of a trigger haptic effect when the trigger is in a maximum closed position outside of a closed extended travel range, an extended frame (such as extended frame 700) can be used as grounding for an object (such as object 720) that moves the trigger. In this situation, even when the trigger has fully moved to a maximum closed position outside of the closed extended travel range, the trigger can still move against the object and a significant haptic feedback sensation can be generated at the trigger.

FIG. 7 includes views 701 and 702. View 701 is a view of the controller where object 720 (e.g., a user's finger) has pushed, pulled, or otherwise moved trigger 710, and where object 720 is grounded (i.e., bottomed out) on extended frame 700. Because object 720 is grounded on extended frame 700, trigger 710 is not resting at, or otherwise making contact with, an inner rotational hard stop, or an inner portion of a housing of the controller, when trigger 710 is in a maximum closed position outside of closed extended travel range 730. In other words, extended frame 700 creates closed extended travel range 730, where closed extended travel range 730 is a range that trigger 710 can rotate, or otherwise move, within, in response to a force that is produced by a targeted motor or actuator and applied to trigger 710. By creating closed extended travel range 730, extended frame 700 can prevent trigger 710 from grounding on the inner rotational hard stop, or the inner portion of the housing, when trigger 710 rotates, or otherwise moves, in response to the force that is applied to trigger 710. This can increase a magnitude of a trigger haptic effect (e.g., kinesthetic haptic effect) experienced at trigger 710.

View 702 is a view of the controller where a targeted motor or actuator applies a force to trigger 710, and trigger 710 rotates, or otherwise moves, in response to the force. As illustrated in view 702 of FIG. 7, trigger 710 rotates, or otherwise moves, into closed extended travel range 730, and occupies at least a portion of closed extended travel range 730.

In an alternate embodiment, extended frame 700 can be replaced with an inner spring. The inner spring can be positioned between trigger 710 and an inner rotational hard stop, or an inner portion of a housing of the controller. Further, the inner spring can push trigger 710 where object 720 has pushed, pulled, or otherwise moved trigger 710 such that trigger 710 is not resting at, or otherwise making contact with, an inner rotational hard stop, or an inner portion of a housing of the controller (i.e., such that closed extended travel range 730 is created). In this alternate embodiment, a stiffness of inner spring can be calculated in order to provide sufficient resistance to prevent trigger 710 from resting at, or otherwise making contact with, an inner rotational hard stop, or an inner portion of a housing of the controller.

Figure 8:
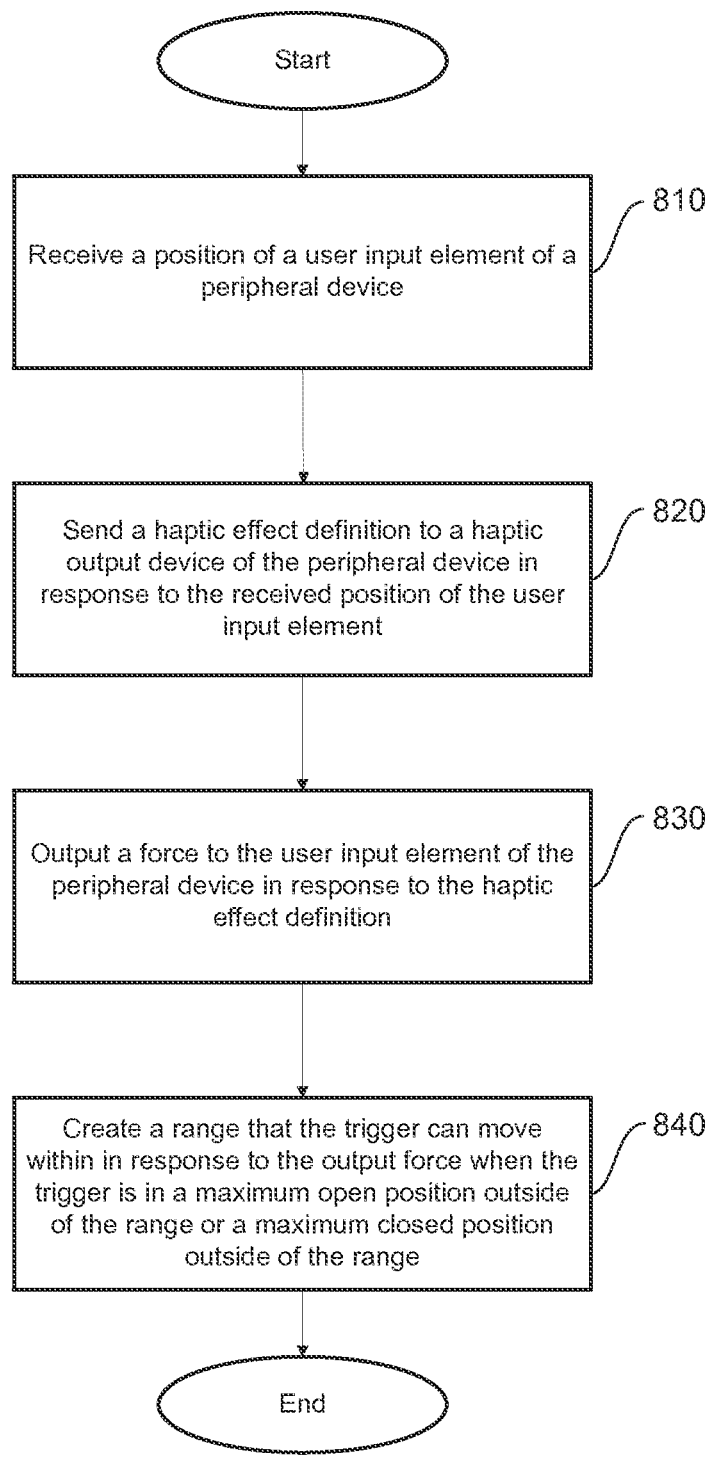
FIG. 8 illustrates a flow diagram of the functionality of a haptic trigger modification module, according to an embodiment of the invention.

FIG. 8 illustrates a flow diagram of the functionality of a haptic trigger modification module (such as haptic trigger modification module 16 of FIG. 1), according to an embodiment of the invention. In one embodiment, the functionality of FIG. 8 is implemented by software stored in memory or other computer-readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 810. At 810, a position of a user input element of a peripheral device is received. The peripheral device can be a controller or a gamepad. The peripheral device can further include a housing, a user input element, a position sensor coupled to the user input element, a haptic output device located within the housing and coupled to the user input element, and a haptic diminishment prevention component. The haptic output device can be an actuator. In an embodiment where the haptic output device is an actuator, the actuator can be a motor configured to exert a bi-directional push/pull force. The haptic diminishment prevention component can be a spring. In an embodiment where the haptic diminishment prevention component is a spring, the spring can be a cantilever spring. In an alternate embodiment where the haptic diminishment prevention component is a spring, the spring can be a compression spring. In an alternate embodiment, the haptic diminishment prevention component can be a frame. In an embodiment where the haptic diminishment prevention component is a frame, the frame can be an extended frame that is an extension of an outer portion of the housing. In one embodiment, a user input element can be a trigger. The flow then proceeds to 820.

At 820, a haptic effect definition is sent to the haptic output device of the peripheral device in response to the received position of the user input element. The haptic effect definition can include haptic data to produce a haptic effect at a user input element of the peripheral device. In one embodiment, the haptic effect definition can be a trigger haptic effect definition that can include haptic data to produce a trigger haptic effect at a trigger of the peripheral device. In one embodiment, a processor causes the haptic effect definition to be sent to the haptic output device. Further, in one embodiment, the haptic effect definition is generated by the processor in response to the position of the user input element of the peripheral device. In one embodiment, the processor is located within the housing of the peripheral device. In an alternate embodiment, the processor is remotely located from the housing of the peripheral device. The flow then proceeds to 830.

At 830, a force is output to the user input element of the peripheral device in response to the haptic effect definition. In one embodiment, the haptic output device of the peripheral device can output the force, and the processor can cause the haptic output device to output the force. Further, in one embodiment, the force is transmitted from the haptic output device to the user input element as a kinesthetic haptic effect. The flow then proceeds to 840.

At 840, a range is created that the user input element can move within in response to the output force when the user input element is in at least one of: a maximum open position outside of the range; or a maximum closed position outside of the range. In one embodiment, the haptic diminishment prevention component of the peripheral device can create the range. In one embodiment, the maximum open position of the user input element can be a position of the user input element such that the user input element has not moved into the housing, and the maximum closed position of the user input element can be a position of the user input element such that the user input element has moved a maximum distance into the housing. In one embodiment, the haptic diminishment prevention component is a spring when the user input element is in the maximum open position outside of the range. In this embodiment, the spring can maintain the user input element in a position such that there is an open extended travel range between the user input element and an outer portion of the housing. This open extended travel range can be the range that the user input element can move within in response to the output force. In another embodiment, the haptic diminishment prevention component is a frame when the user input element is in the maximum closed position outside of the range. In this embodiment, an object can ground on the frame when the object moves the user input element into the maximum closed position outside of the range, and the position of the user input element is such that there is a closed extended travel range between the user input element and an inner portion of the housing. This closed extended travel range can be the range that the user input element can move within in response to the output force. In another embodiment, the haptic diminishment prevention component is a spring when the user input element is in the maximum closed position outside of the range. In this embodiment, the spring can maintain the user input element in a position such that there is a closed extended travel range between the user input element and an inner portion of the housing when an object moves the user input element into the maximum closed position outside of the range. The flow then ends.

Figure 9:
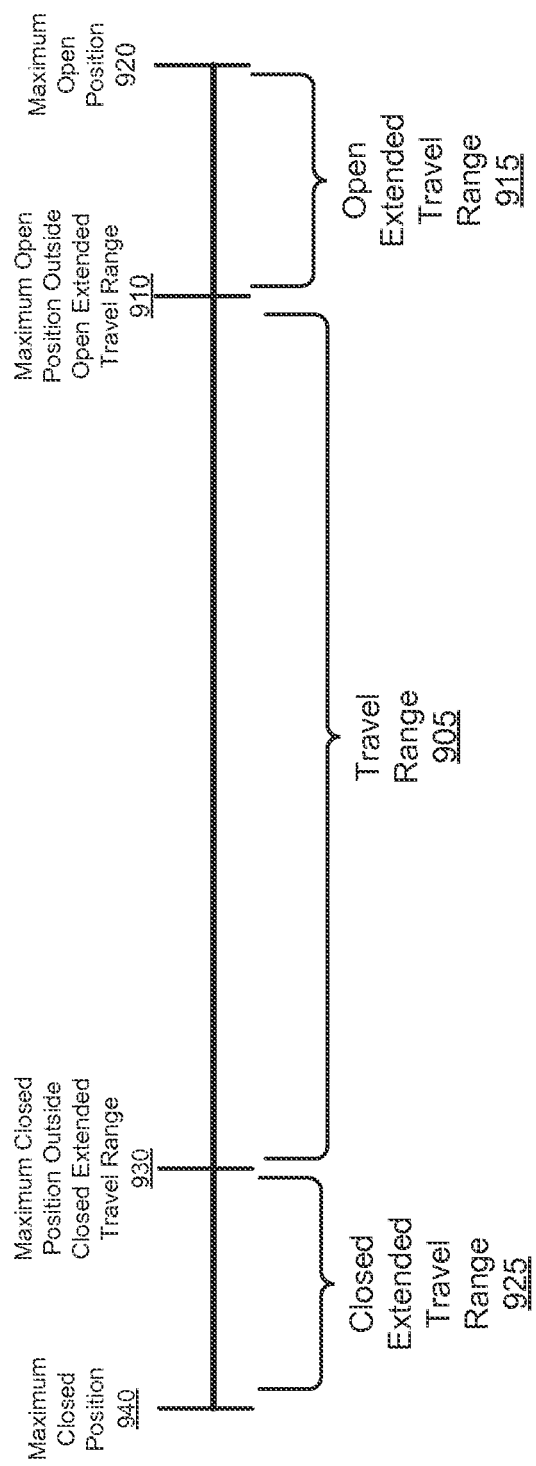
FIG. 9 illustrates a maximum open position that is outside an open extended travel range for a trigger, and a maximum closed position that is outside a closed extended travel range for the trigger, according to an embodiment of the invention.

FIG. 9 illustrates a maximum open position that is outside an open extended travel range for a trigger, and a maximum closed position that is outside a closed extended travel range for the trigger, according to an embodiment of the invention. As previously described, a peripheral device, such as a controller or a gamepad, can include a trigger (or some other use input element), a housing, and one or more haptic diminishment prevention components. The trigger can have a travel range 905. A first haptic diminishment prevention component can create an open extended travel range 915. Thus, when little or no force is applied to the trigger, such that the trigger has not begun to rotate, or otherwise move, into the housing, the first haptic diminishment prevention component can place the trigger in a maximum open position that is outside of open extended travel range 915 (i.e., maximum open position outside open extended travel range 910 or position 910). When a force that is generated by an actuator is applied to the trigger, the force can move the trigger from position 910 to a position between position 910 and a maximum open position 920, or to maximum open position 920. Similarly, a second haptic diminishment prevention component can create a closed extended travel range 925. Thus, when a force is applied to the trigger, such that the trigger has rotated, or otherwise moved, a maximum distance into the housing, the second haptic diminishment prevention component can place the trigger in a maximum closed position that is outside of closed extended travel range 925 (i.e., maximum closed position outside closed extended travel range 930 or position 930). When a secondary force that is generated by an actuator and is applied to the trigger, the secondary force can move the trigger from position 930 to a position between position 930 and a maximum closed position 940, or to maximum closed position 940.

Thus, in one embodiment, a peripheral device can include one or more haptic diminishment prevention components, such as springs or frames, where a haptic diminishment prevention component is configured to increase a magnitude of a trigger haptic effect experienced at a trigger when the trigger is either in a maximum open position outside of the range or a maximum closed position outside of the range. Increasing a magnitude of haptic feedback sensations for these key locations can allow for richer trigger haptic effects that consume less power. By providing richer trigger haptic effects, a more realistic and immersive gaming experience can be provided.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A peripheral device, comprising:
    a housing;
    a user input element, wherein the user input element is positioned within the housing so that a first contact with the housing defines a first maximum range of a first movement of the user input element;
    a position sensor coupled to the user input element, wherein the position sensor is configured to detect a position of the user input element within the first maximum range, and wherein the position sensor is further configured to send the position to a processor;
    a haptic output device located within the housing and coupled to the user input element, wherein the haptic output device is configured to receive a haptic effect definition from the processor, and is further configured to output a force to the user input element in response to the haptic effect definition; and
    a haptic diminishment prevention component that defines a first diminishment range of the first movement of the user input element, wherein the first diminishment range is less than the first maximum range and prevents the first contact with the housing;
    wherein the haptic diminishment prevention component is configured to modify a magnitude of the force to the user input element depending on the position of the user input element as detected by the position sensor.

2. The peripheral device of claim 1,
    wherein the haptic diminishment prevention component comprises a spring; and
    wherein the spring maintains the user input element in a position such that there is an open extended travel range between the user input element and the housing.

3. The peripheral device of claim 2, wherein the spring comprises at least one of: a compression spring or a cantilever spring.

4. The peripheral device of claim 1,
    wherein the user input element is positioned within the housing so that a second contact with the housing defines a second maximum range of a second movement of the user input element;
    wherein the haptic diminishment prevention component defines a second diminishment range of the second movement of the user input element, wherein the second diminishment range is less than the second maximum range and prevents the second contact with the housing.

5. The peripheral device of claim 1, wherein the force is transmitted from the haptic output device to the user input element as a kinesthetic haptic effect.

6. The peripheral device of claim 1, wherein the haptic output device comprises an actuator.

7. The peripheral device of claim 6, wherein the actuator comprises a motor configured to exert a bi-directional push/pull force.

8. The peripheral device of claim 1, wherein the haptic effect definition is generated by the processor in response to the position of the user input element.

9. The peripheral device of claim 1, wherein the user input element is a trigger, and the first movement of the user input element is moving the trigger a maximum distance into the housing in a closed position.

10. The peripheral device of claim 4, wherein the user input element is a trigger, and the second movement of the user input element is a maximum distance outside of the housing in an open position.

11. The peripheral device of claim 1, wherein the user input element comprises one of: a button, a bumper, an analog stick, a digital stick, a driving wheel, or a rotatable trigger.

12. The peripheral device of claim 1, wherein the haptic diminishment prevention component is further configured to prevent the user input element from grounding when the user input element is positioned at each of the first maximum range and a second maximum range.

13. A non-transitory computer-readable medium having instructions stored thereon that, when executed by a processor, cause the processor to modify a haptic effect experienced at a user input element, the modifying comprising:
   receiving, from a position sensor, a position of the user input element within a first maximum range of a peripheral device, the peripheral device comprising a housing, the user input element, a haptic output device located within the housing and coupled to the user input element, and a haptic diminishment prevention component;
   sending a haptic effect definition to the haptic output device in response to the position of the user input element; and
   causing the haptic output device to output a force to the user input element of the peripheral device in response to the haptic effect definition;
   wherein the user input element is positioned within the housing so that a first contact with the housing defines the first maximum range of a first movement of the user input element;
   wherein the haptic diminishment prevention component defines a first diminishment range of the first movement of the user input element, wherein the first diminishment range is less than the first maximum range and prevents the first contact with the housing, and
   wherein the haptic diminishment prevention component is configured to modify a magnitude of the force to the user input element depending on the position of the user input element as detected by the position sensor.

14. The non-transitory computer-readable medium of claim 13,
   wherein the haptic diminishment prevention component comprises a spring; and
   wherein the spring maintains the user input element in a position such that there is the open extended travel range between the user input element and the housing.

15. The non-transitory computer-readable medium of claim 13, wherein the spring comprises at least one of: a compression spring or a cantilever spring.

16. The non-transitory computer-readable medium of claim 13,
   wherein the user input element is positioned within the housing so that a second contact with the housing defines a second maximum range of a second movement of the user input element;
   wherein the haptic diminishment prevention component defines a second diminishment range of the second movement of the user input element, wherein the second diminishment range is less than the second maximum range and prevents the second contact with the housing.

17. The non-transitory computer-readable medium of claim 13, wherein the user input element is a trigger, and the first movement of the user input element is moving the trigger a maximum distance into the housing in a closed position.

18. The non-transitory computer-readable medium of claim 16, wherein the user input element is a trigger, and the second movement of the user input element is a maximum distance outside of the housing in an open position.

19. A computer-implemented method for modifying a haptic effect experienced at a user input element, the computer-implemented method comprising:
   receiving, from a position sensor, a position of the user input element within a first maximum range of a peripheral device, the peripheral device comprising a housing, the user input element, a haptic output device located within the housing and coupled to the user input element, and a haptic diminishment prevention component;
   sending a haptic effect definition to the haptic output device in response to the position of the user input element; and
   causing the haptic output device to output a force to the user input element of the peripheral device in response to the haptic effect definition;
   wherein the user input element is positioned within the housing so that a first contact with the housing defines the first maximum range of a first movement of the user input element;
   wherein the haptic diminishment prevention component defines a first diminishment range of the first movement of the user input element, wherein the first diminishment range is less than the first maximum range and prevents the first contact with the housing, and
   wherein the haptic diminishment prevention component is configured to modify a magnitude of the force to the user input element depending on the position of the user input element as detected by the position sensor.

20. The computer-implemented method of claim 19, wherein the user input element is a trigger, and the first movement of the user input element is moving the trigger a maximum distance into the housing in a closed position.

21. The computer-implemented method of claim 19, wherein the user input element is a trigger, and the first movement of the user input element is a maximum distance outside of the housing in an open position.

22. The computer-implemented method of claim 19, wherein the haptic diminishment prevention component comprises a spring; and
   wherein the spring maintains the user input element in a position such that there is an the open extended travel range between the user input element and the housing.

* * * * *